(12) United States Patent
Konik et al.

(10) Patent No.: US 9,424,300 B2
(45) Date of Patent: Aug. 23, 2016

(54) DATA ALLOCATION CONTAINERS IN A PARTITIONED TABLE OF A COMPUTER DATABASE SYSTEM FOR HOLDING DATA BASED ON USAGE

(71) Applicant: International Business Machines Corporation, Armonk, NY (US)

(72) Inventors: Rafal P. Konik, Oronoco, MN (US);
Roger A. Mittelstadt, Byron, MN (US);
Brian R. Muras, Rochester, MN (US);
Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 14/036,058

(22) Filed: Sep. 25, 2013

(65) Prior Publication Data
US 2015/0088912 A1    Mar. 26, 2015

(51) Int. Cl.
*G06F 17/30* (2006.01)
(52) U.S. Cl.
CPC .... *G06F 17/30339* (2013.01); *G06F 17/30315* (2013.01); *G06F 17/30551* (2013.01)
(58) Field of Classification Search
CPC ............... G06F 17/30339; G06F 17/30551; G06F 17/30315
USPC ........................................................ 707/751
See application file for complete search history.

(56) References Cited

U.S. PATENT DOCUMENTS

| | | | | |
|---|---|---|---|---|
| 6,324,620 | B1* | 11/2001 | Christenson et al. | 711/112 |
| 8,429,346 | B1* | 4/2013 | Chen et al. | 711/114 |
| 8,566,549 | B1* | 10/2013 | Burke et al. | 711/168 |
| 8,583,838 | B1* | 11/2013 | Marshak et al. | 710/18 |
| 8,868,797 | B1 | 10/2014 | Kirac et al. | |
| 8,935,493 | B1 | 1/2015 | Dolan et al. | |
| 2004/0255237 | A1* | 12/2004 | Tong | 715/501.1 |
| 2005/0198062 | A1* | 9/2005 | Shapiro | 707/102 |
| 2006/0259728 | A1* | 11/2006 | Chandrasekaran et al. | 711/170 |
| 2010/0306493 | A1* | 12/2010 | Carrillo et al. | 711/167 |
| 2010/0332401 | A1 | 12/2010 | Prahlad et al. | |
| 2011/0010488 | A1* | 1/2011 | Aszmann et al. | 711/103 |
| 2011/0167217 | A1 | 7/2011 | Montgomery | |
| 2012/0173831 | A1* | 7/2012 | Rubio et al. | 711/165 |
| 2012/0185648 | A1* | 7/2012 | Benhase et al. | 711/118 |
| 2012/0198153 | A1* | 8/2012 | Fuente et al. | 711/114 |

(Continued)

OTHER PUBLICATIONS

Levandoski et al., "Identifying Hot and Cold Data in Main-Memory Databases," 2013 IEEE 29th International Conference on Data Engineering (ICDE), available online at http://research.microsoft.com/apps/pubs/default.aspx?id=176690.

*Primary Examiner* — Rehana Perveen
*Assistant Examiner* — Tiffany Thuy Bui
(74) *Attorney, Agent, or Firm* — Martin & Associates, LLC; Bret J. Petersen

(57) ABSTRACT

An apparatus and method utilize partitioned database tables divided into data allocation containers (DACs) where data is placed into the DACs based on usage of the data in past queries. Records that are used most often are placed together and records that are used less often are placed together to improve database performance. In preferred embodiments, a database manager determines where to place data into the DACs based on how often the data is selected by a database query using a DAC selection ratio (DSR). The database manager may determine when to perform table maintenance to move rows of data to the appropriate DACs based on a timestamp or last check date (LCD) stored in the database.

15 Claims, 6 Drawing Sheets

(56) References Cited

U.S. PATENT DOCUMENTS

| | | | |
|---|---|---|---|
| 2012/0296883 A1* | 11/2012 | Ganesh et al. | 707/693 |
| 2013/0151803 A1* | 6/2013 | Tofano | 711/165 |
| 2013/0246711 A1 | 9/2013 | Testardi et al. | |
| 2013/0297873 A1* | 11/2013 | Hyde et al. | 711/117 |
| 2014/0189205 A1* | 7/2014 | Sinclair et al. | 711/103 |

* cited by examiner

DATA ALLOCATION CONTAINERS IN A PARTITIONED TABLE OF A COMPUTER DATABASE SYSTEM FOR HOLDING DATA BASED ON USAGE

BACKGROUND

1. Technical Field

This invention generally relates to computer database systems, and more specifically relates to specialized partitioned tables in a computer database system where the partitioned tables are divided into data allocation containers (DACs) where data is placed into the DACs based on usage of the data in past queries.

2. Background Art

Database systems allow a computer to store a large amount of information in a way that allows a user to search for and retrieve specific information in the database. The information is typically stored in database tables. The tables contain columns and rows of data. The data in the table is related to or associated with other data in corresponding columns and rows. Relationships of the data are stored in indexes.

Retrieval of information from a database is typically done using queries. A database query typically includes one or more predicate expressions interconnected with logical operators. The database is searched for records that satisfy the query, and those records are returned as the query result. In database systems it is common for identical or closely related queries to be issued frequently.

Partitioned tables are used to improve the scalability and manageability of large tables and tables that have varying access patterns. When tables and indexes become very large, partitioning can help by partitioning the data into smaller, more manageable sections. In the prior art, an partitioned table is a database table that takes related data and combines the data into separate containers, or combines the data together to improve performance while accessing the data.

BRIEF SUMMARY

In accordance with the preferred embodiments, an apparatus and method utilize partitioned database tables divided into data allocation containers (DACs) where data is placed into the DACs based on usage of the data in past queries. Records that are used most often are placed together and records that are used less often are placed together to improve database performance. In preferred embodiments, a database manager determines where to place data into the DACs based on how often the data is selected by a database query using a DAC selection ratio (DSR). The database manager may determine when to perform table maintenance to move rows of data to the appropriate DACs based on a timestamp or last check date (LCD) stored in the database.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The preferred embodiments of the present invention will hereinafter be described in conjunction with the appended drawings, where like designations denote like elements, and:

DETAILED DESCRIPTION

The preferred embodiments herein provide an apparatus and method to allocated data into partitioned database tables divided into data allocation containers (DACs) where data is placed into the DACs based on usage of the data in past queries. Records that are used most often are placed together and records that are used less often are placed together to improve database performance. In preferred embodiments, a database manager determines where to place data into the DACs based on how often the data is selected by a database query using a DAC selection ratio (DSR). The database manager may determine when to perform table maintenance to move rows of data to the appropriate DACs based on a timestamp or last check date (LCD) stored in the database.

Figure 1:
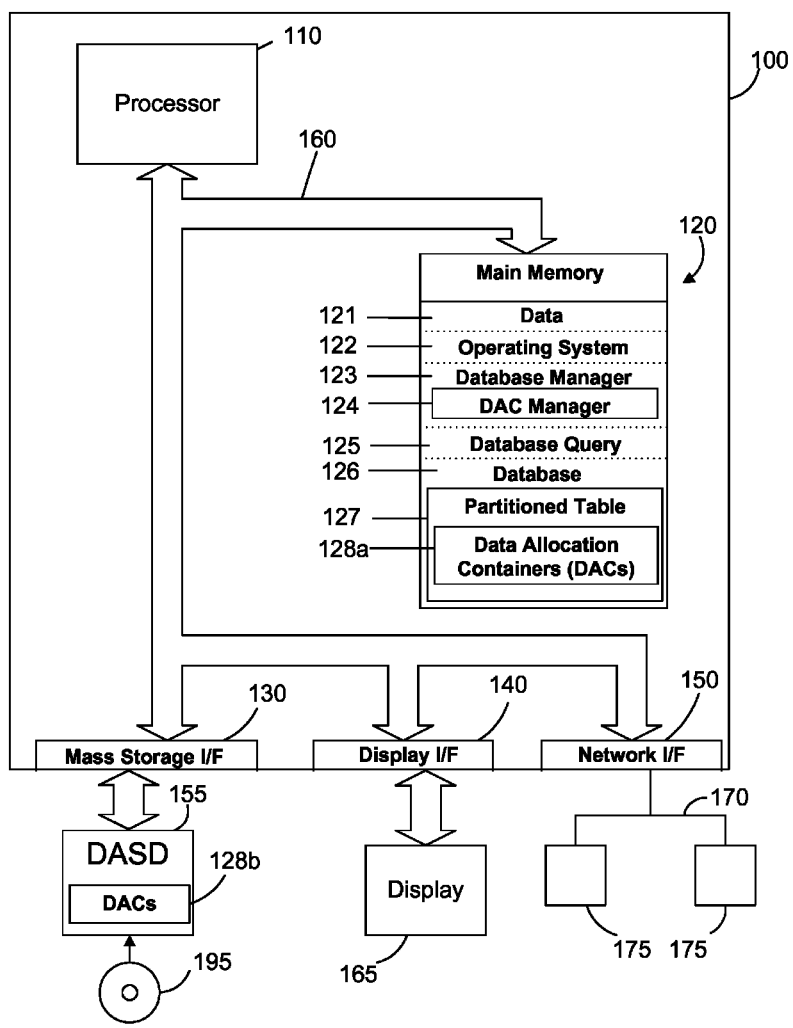
FIG. 1 illustrates a block diagram of a computer system apparatus with a partitioned table having data allocation containers (DACs) as described herein.

Referring now to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices such as a direct access storage device (DASD) 155 to computer system 100. One specific type of direct access storage device 155 is a readable and writable CD RW drive, which may store data to and read data from a CD RW 195. Alternatively, the DASD may be a storage device such as a magnetic disk drive or a solid state disk drive.

Main memory 120 in accordance with the preferred embodiments contains data 121, and an operating system 122. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. The main memory 120 also includes a database manager 123 with a data access container (DAC) manager 124, a database query 125 and a database 126. Database 126 is any suitable database, whether currently known or developed in the future. Database 126 includes one or more tables including a partitioned table 127 that is divided into data allocation containers (DACs) 128*a*. Preferably the DACs are not all contained in the main memory 120. One or more DACs 128*a* are located in main memory 120, and the remainder of the DACs 128*b* which are associated with the same partitioned table 127 are located in a mass storage device 155 or other remote storage. This allows the data in the database 126 that is used most often to reside in memory that has a faster access time to increase the efficiency of the database and the entire computer system 100. The DAC manager 124 may be integrated with or separate from the database manager 123.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database manager 123, database query 125, and the database 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the data allocation containers may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD RW (e.g., 195 of FIG. 1), and transmission type media such as digital and analog communications links. Note that the preferred signal bearing media is tangible.

Figure 2:
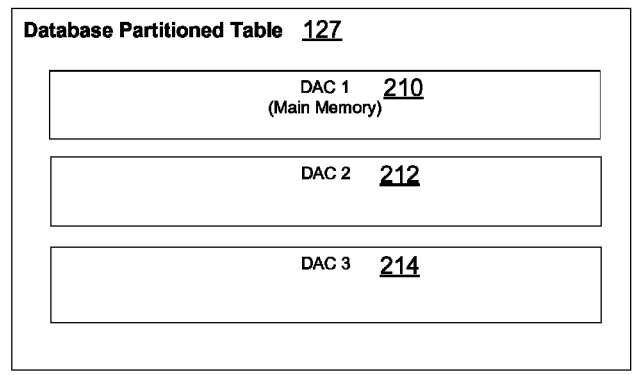
FIG. 2 illustrates a block diagram of a partitioned table with DACs as described herein.

FIG. 2 illustrates a block diagram of a database partitioned table 127 divided into three data allocation containers (DAC1, DAC2, DAC3) 210, 212, 214. DAC1 210 corresponds to the DAC 128*a* in FIG. 1, and DAC2 212 and DAC3 214 correspond to the DAC 128*b* in FIG. 1. DAC1 210 is placed in main memory 120 (FIG. 1) or another data storage location (such as a solid state disk drive) with a low access time to increase the efficiency of the computer system 100 as described herein. The DAC manager 124 places data into the DACs based on usage of the data in past queries to improve database performance and utility as described further below. The size of each of the DACs may vary depending, for example, on the size of the available memory where the DAC is located (Random Access Memory (RAM), local hard disk, remote hard disk, buffer pool, or solid state drive). The partitioned tables herein may use indexes over the tables in the same manner known in the prior art for partitioned tables. However a partitioning key or partitioning index as used in the prior art is not required.

Figure 3:
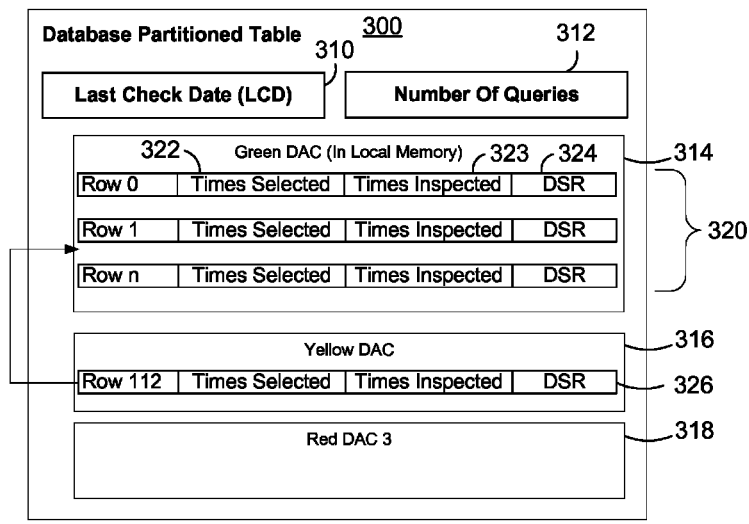
FIG. 3 illustrates a block diagram of a partitioned table with DACs that use the number of times selected for each row to arrange data into the DACs.

FIG. 3 illustrates an example of a partitioned table with DACs as claimed herein. In this example, the DAC manager uses the number of times each row of data is selected to arrange data into the DACs. The partitioned table 300 in FIG. 3 is an example partitioned table that corresponds to the partitioned table 127 in FIG. 1. The partitioned table 300 includes a data value for a last check date (LCD) 310 and a counter for the number of queries (NOQ) 312 made to the partitioned table 300. The LCD is a data value or time stamp preferably maintained by the DAC manager 124 (FIG. 1) in the header of the table. The DAC manager updates the LCD each time partitioning maintenance is performed to move rows within the DACs as described below. Alternatively, the LCD could be a value to indicate when partitioning maintenance should be performed. The DAC manager could then check each time a query is executed or at some periodic interval to determine if maintenance should be performed. Each time the partitioned table 300 is accessed, the DAC manager 124 (FIG. 1) increments the NOQ 312. The NOQ 312 is used to compute a data selection ratio (DSR) as described below.

Again referring to FIG. 3, the partitioned table 300 in this example has three DACs—Green DAC 314, Yellow DAC 316 and Red DAC 318. In this example, the Green DAC 314 is for storing the hottest data, or data that is accessed or used most often. The Green DAC 314 is preferably located in memory or in a data storage device with a fast access time. The Yellow DAC 316 is used to store data with a moderate amount of use and may be stored in a location with a moderate access time. The Red DAC 318 is used for storing data that is used less often and may be stored in a location that has the slowest or highest access time. Each of the DACs is divided into a number of rows of data as is common in database tables. Green DAC shows rows 0, 1 and "n" 320 for illustration. In this example, each of the rows 320 include in the row data a value for the number of times selected (TS) 322, and a DAC selection ratio (DSR) 324. The TS 322 is preferably incremented by the DAC manager each time the row is selected or accessed by a query. The TS may be incremented at other times and by amounts other than one as described below. The DSR 324 is preferably computed by the DAC manager and may or may not be actually stored in the row as shown. The DSR for each row is preferably computed as the TS 322 divided by the NOQ 312 for the table. In this example, the DSR would range between 0 and 1. The DSR range can be assigned to the DACs depending on the number of DACs, the size of the DACs and the amount of data. For example, the Green DAC 314 may be for rows with a DSR of 0.67 to 1, the Yellow DAC 316 for rows with a DSR of 0.34 to 0.66, and the Red DAC 318 for rows with a DSR of 0 to 0.33. The DSR range for a DAC may need to be adjusted periodically. The DAC manager may also allow for the DSR ranges to be set by the user.

As introduced in FIG. 3, each row of data in the DACs include a value for the number of times selected (TS). In another variation of the example in FIG. 3, each row may also hold a value for the number of times inspected (TI) 323 that indicates how many times the row was looked at by a query but not selected. The DAC manager may use the TI 323 in addition to the TS 322 to determine in which DACS to place rows of data. For example, rows with the highest TS value could be placed in a first DAC and rows with the highest TI 323 could be placed in a second DAC.

Again referring to FIG. 3, the partitioned table 300 requires maintenance to adjust records from one DAC to another and a method to initially place records into the DACs. Data initially inserted into the table can be assumed to be important and therefore is added to the highest priority DAC. The newly added data can be added to a row with a DSR set to an initial value such as 1.0. Data in the database partitioned table must be maintained in some manner to keep data in the proper priority DAC. Maintenance of the data can be done periodically as a background task by the DAC manager. Records are typically deleted from one DAC and added to a more appropriate DAC depending on the DSR. For the example in FIG. 3, DAC maintenance could be performed periodically by looking at the DSRs and moving records accordingly. For example, the Yellow DAC 316 in FIG. 3 has a record in row 112. During periodic maintenance, the DAC manager determines that this record has a DSR that is higher than the range specified for the Yellow DAC 316 and moves the record to a row in the Green DAC 314 as shown.

Another consideration for database partitioned tables as shown in FIG. 3 is the situation where usage of a record changes dramatically. For example, if a record in the past was used very little, the DSR in the above example would be low even if the record recently was used quite often. One way to deal with this situation is to have the TS 322 to have more than one value. The TS 322 could include a second value that is updated on a different time basis. For example, the TS 322 could include a number of times selected weekly. This value could be updated on a weekly basis each time the row is selected. Similarly other time periods could be used and multiple values could be used within the TS 322. This is similar to the bit map example described below, except the TS 322 is a number of times selected rather than a single bit indicator in the bit map.

Figure 4:
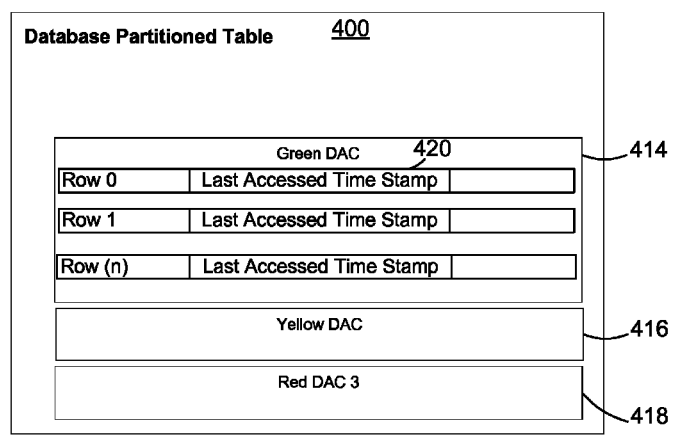
FIG. 4 illustrates a block diagram of a partitioned table with DACs that use the last accessed time stamp for each row to arrange data into the DACs.

FIG. 4 illustrates another example of a partitioned table with DACs as claimed herein. In this example, the DAC manager uses a time stamp to arrange data into the DACs. The partitioned table 400 in FIG. 4 is an example partitioned table that corresponds to the partitioned table 127 in FIG. 1. Each row of data in the database partitioned table 400 includes a last accessed time stamp (LATS) 420 as shown in the Green DAC 414. In this example, rows of data are moved to an appropriate DAC based on the LATS 420. The LATS is updated each time the row is accessed by the DAC manager and the data is dynamically moved to the appropriate DAC. The DAC manager may move the row at the time the row is accessed, or it may periodically check and update data row placement in the DACs. The various DACs can be assigned a time range for placement of the data and the time range may be periodically adjusted to balance the size of the DACs. The LATS may also be a time stamp may be replaced with a time stamp for the time the row was last updated instead of accessed.

Figure 5:
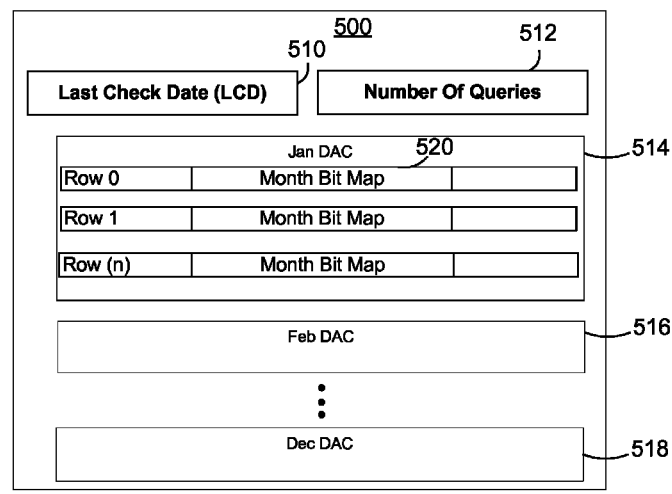
FIG. 5 illustrates a block diagram of another partitioned table with DACs that use the last accessed time stamp for each row to arrange data into the DACs.

FIG. 5 illustrates another example of a partitioned table 500 with DACs as claimed herein. In this example, the DAC manager uses a time based bit map to arrange data into the DACs where each DAC is assigned a corresponding time base. The time base for the bit map may be years, months, weeks, days, hours, minutes, or seconds. In the illustrated example, there is a DAC for each calendar month. The months of January 514, February 516 and December 518 are illustrated. Each row in the database has a month bit map 520 as shown in the January DAC 514. In a first example, the month bit map 520 has a single bit of data for each month that can be set to indicate the corresponding row of data was accessed for that month. Alternatively, the bit map could be a character value indicating the last month that the row was accessed. The DAC manager places rows in the appropriate DAC based on the month bit map 520. Alternatively, the bit map could indicate another time frame. For example, a week bit map could be used to indicate what week the row was last accessed by a query. The partitioned table 500 may also include a last check date (LCD) 510 and a number of queries (NOQ) 512 value in the partitioned table 300 similar to those described above. The LCD 510 and the NOQ 512 may be used by the DAC manager to determine when to update the positioning of rows in the DACs. For example, the DAC manager could determine to update the DACs when the LCD 510 is a particular value and the NOQ 512 is within a specified range.

Figure 6:
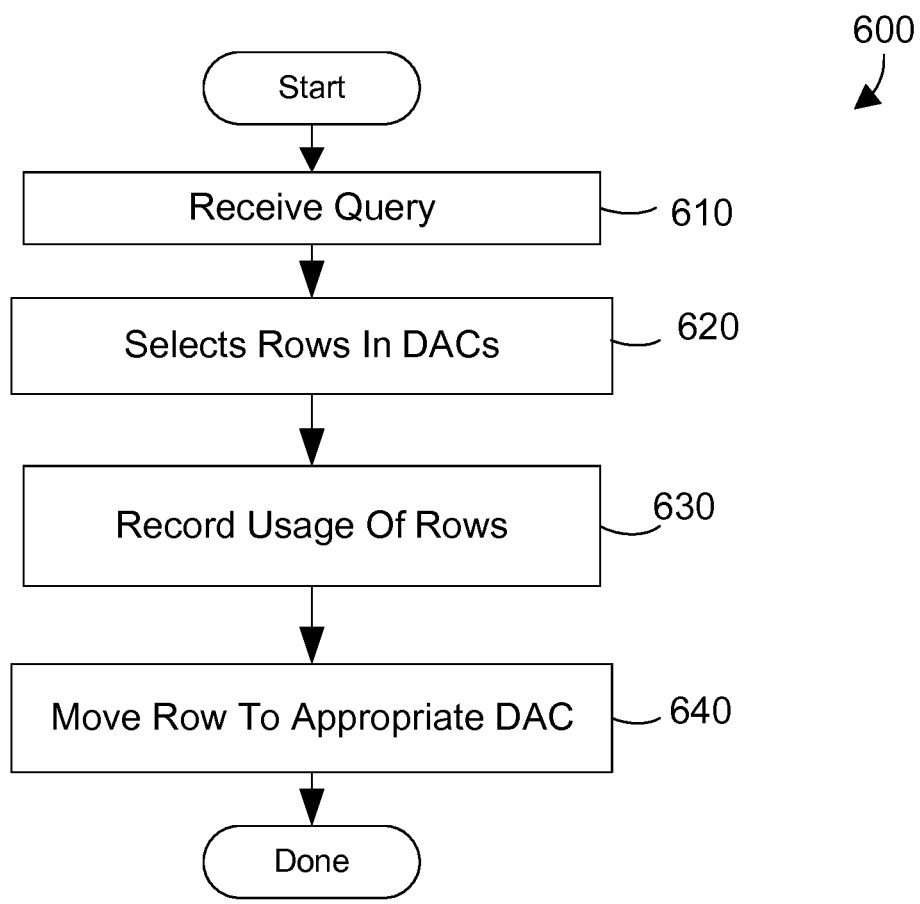
FIG. 6 is an example flow diagram of a method according to preferred embodiments.

Referring now to FIG. 6, a flow diagram shows a method 600 for utilizing partitioned database tables divided into data allocation containers (DACs) where data is placed into the DACs based on usage of the data in past queries. The method 600 is presented as a series of steps performed by a computer software program described above as a database manager 123 with a DAC manager 124. The database manager 123 receives a query (step 610). The database manager 123 processes the query and the query specifies a row of data in the DAC to select (step 620). The DAC manager 124 records appropriate data regarding the usage of the row of data in the partitioned table by the query to determine placement of the row of data into the DACs (step 630). The DAC manager at an appropriate time interval moves the row of data accessed to an appropriate DAC in the partitioned table based on the recorded data regarding the usage of the row (step 640). Step 640 may be executed each time a query is processed, or may be executed on a periodic basis for DAC management determined by the DAC manager. The method 600 is then done until another query is processed.

Figure 7:
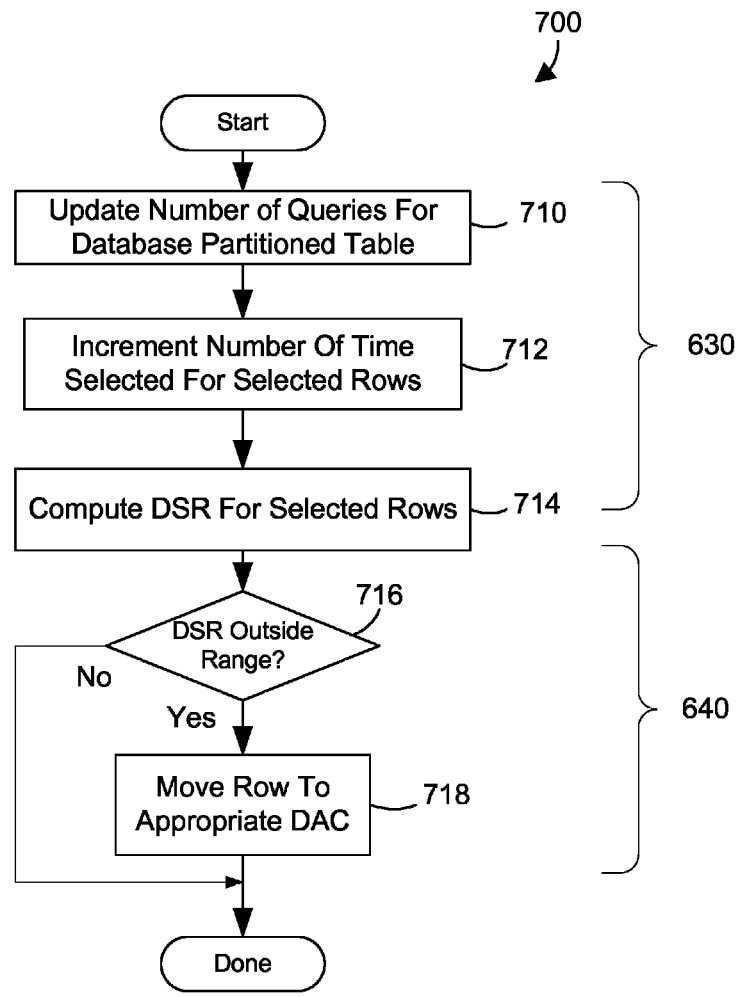
FIG. 7 is another example flow diagram of a method according to preferred embodiments.

Referring now to FIG. 7, a flow diagram shows a method 700 for utilizing partitioned database tables divided into data allocation containers (DACs) where data is placed into the DACs based on usage of the data in past queries. Method 700 provides additional details of steps 630 and 640 in FIG. 6 after the database manager 123 selects a number of rows in the DAC. Method 700 provides the method steps for the example shown in FIG. 3. The DAC manager updates the number of queries (NOQ, 312 in FIG. 3) (step 710). The DAC manager increments the number of times selected (TS, 322 in FIG. 3) for each row selected by the query (step 712). The DAC manager computes a DSR for the selected rows (step 714). The DAC manager determines if the DSR is outside a predetermined range (step 716). If the DSR is outside a predetermined range (step 716=yes), then the DAC manager moves the row to an appropriate DAC (step 718) and the method is done until another query is processed. If the DSR is not outside a predetermined range (step 716=no), then method 700 is then done until another query is processed.

Figure 8:
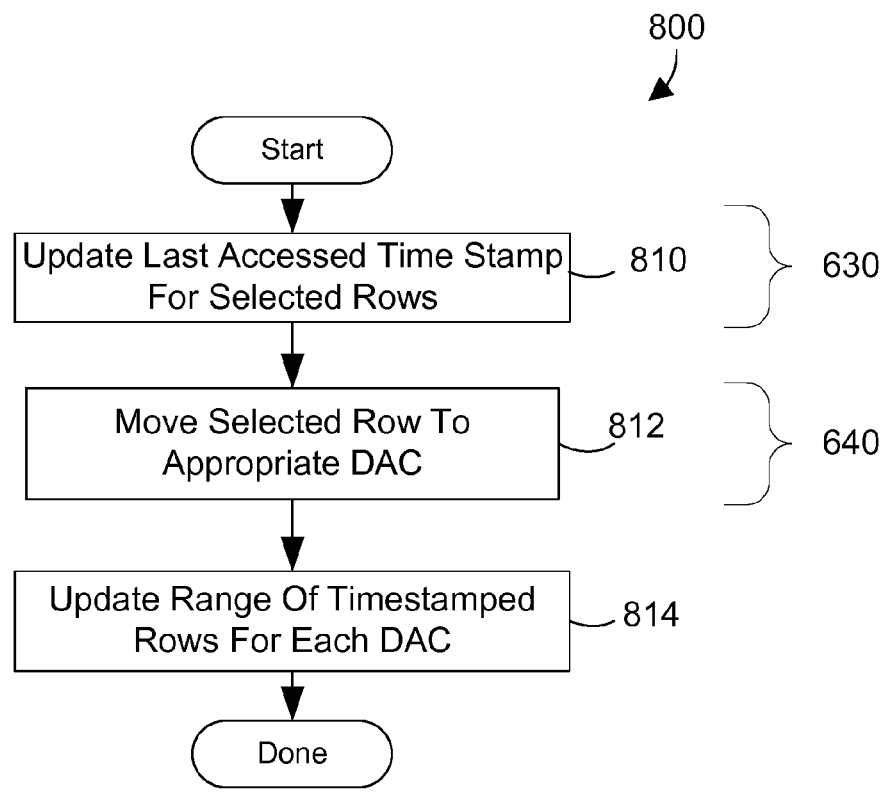
FIG. 8 is another example flow diagram of a method according to preferred embodiments.

Referring now to FIG. 8, a flow diagram shows a method 800 for utilizing partitioned database tables divided into data allocation containers (DACs) where data is placed into the DACs based on usage of the data in past queries. Method 800 provides additional details for another method of carrying out steps 630 and 640 in FIG. 6 after the database manager 123 selects a number of rows in the DAC. Method 800 provides the method steps for the example shown in FIG. 4. The DAC manager updates the last accessed time stamp (LATS, 420 in FIG. 4) (step 810). The DAC manager moves the selected row to an appropriate DAC based on the last accessed time stamp for the selected row (step 812). At some point, the DAC manager may update the range of time stamps that each DAC holds to balance the rows of data in the DACs (step 814). Updating the range of time stamps each DAC holds may be done periodically by a background task. The balancing may not necessarily be equally balanced. For example, the DAC with the highest access time may be smaller than the other DACs. The method 800 is then done.

Figure 9:
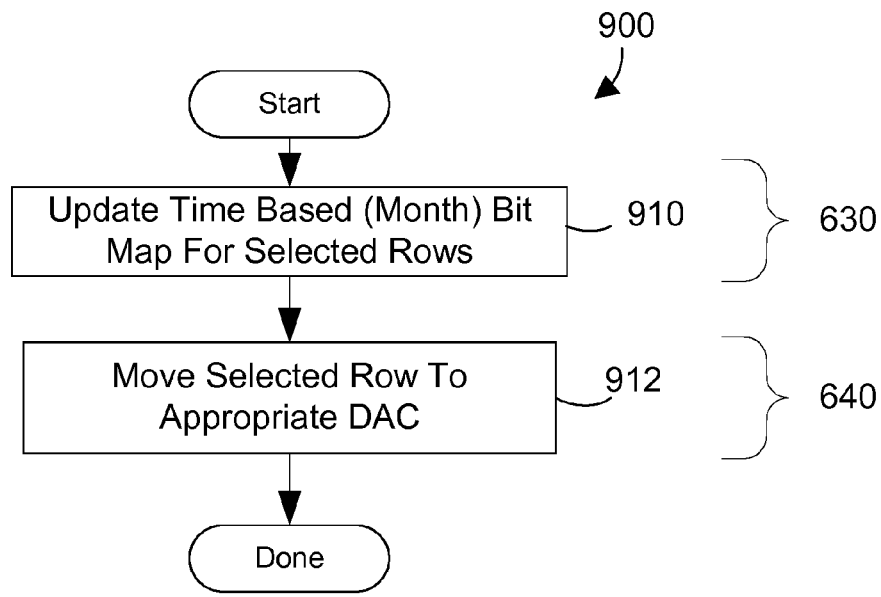
FIG. 9 is another example flow diagram of a method according to preferred embodiments.

Referring now to FIG. 9, a flow diagram shows a method 900 for utilizing partitioned database tables divided into data allocation containers (DACs) where data is placed into the DACs based on usage of the data in past queries. Method 900 provides additional details for another method of carrying out steps 630 and 640 in FIG. 6 after the database manager 123 selects a number of rows in the DAC. Method 900 provides method steps for the example shown in FIG. 5. The DAC manager updates the time based bit map (month bit map, 520 in FIG. 5) (step 910). The DAC manager moves the selected row to an appropriate DAC based on the time based bit map for the selected row (step 912). The method 900 is then done.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. Java is a registered trademark of Oracle America, Inc. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code could also be executed on a virtual machine in a cloud environment.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment. In addition, the service could be divided among various different service providers. For example, multiple providers of mobile data networks could each provide different pieces of the mobile data network disclosed herein that cooperate together to provide the functions disclosed herein.

The disclosure and claims are directed to a system and method for providing an apparatus and method to allocated data into partitioned database tables divided into data allocation containers (DACs) where data is placed into the DACs based on usage of the data in past queries to improve performance while accessing the data in a partitioned database.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a database residing in the memory having data in at least one partitioned database table divided into a plurality of data allocation containers (DACs);
   a database manager with a DAC manager residing in the memory and executed by the at least one processor that determines which of the plurality of DACs to place rows of data into based on usage of the rows of data in past queries from data usage information stored in the rows of the data of the DACs, and
   wherein the data usage information comprises a counter and the DAC manager increments the counter for a number of times selected for each selected row by the query, and computes a DAC selection ratio (DSR) for each selected row by the query from a quotient of a number of queries made to the partitioned table and the number of times selected.

2. The apparatus of claim 1 wherein the plurality of DACs include a high priority DAC placed in a memory device with a faster access time and a low priority DAC placed in a memory device with a slower access time.

3. The apparatus of claim 1 wherein the DAC manager increments a counter for a number of times inspected that indicates how many times the row of data was inspected but not selected.

4. The apparatus of claim 1 wherein the DAC manager determines if the DSR is within a predetermined range for a current DAC, and moves the row of data to a different DAC when the data selection ratio is not within the predetermined range for the current DAC.

5. The apparatus of claim 1 wherein the data usage information comprises a last accessed time stamp and the DAC manager updates the last accessed time stamp for each selected row by the query; and moves the selected row of data to an different DAC based on the last accessed time stamp.

6. The apparatus of claim 1 a wherein the data usage information comprises a time based bit map and the DAC manager updates the time based bit map for each selected row by the query, and moves the selected row of data to a different DAC based on the time based bit map.

7. The apparatus of claim 6 wherein the time based bit map is divided into a time base chosen from the following: years, months, weeks, days, hours, minutes, or seconds.

8. A program product comprising:
   a database manager with a data allocation container (DAC) manager, wherein the DAC manager determines which of a plurality of DACs to place rows of data into based on usage of the rows of data in past queries from data usage information stored in the rows of the data of the DACs, wherein the plurality of DACs include a high priority DAC placed in a memory device with a faster access time and a low priority DAC placed in a memory device with a slower access time;
   wherein the DAC manager increments a counter for a number of times selected for each selected row by the query, and computes a DAC selection ratio (DSR) for each selected row by the query from a quotient of a number of queries made to the partitioned table and the number of times selected; and
   non-transitory computer-readable media bearing the database manager and the DAC manager.

9. The program product of claim 8 wherein the DAC manager updates a last accessed time stamp for each selected row by the query; and moves the selected row of data to an appropriate DAC based on the last accessed time stamp.

10. The program product of claim 8 wherein the DAC manager updates a time based bit map for each selected row by the query, and moves the selected row of data to an appropriate DAC based on the time based bit map.

11. An apparatus comprising:
    at least one processor;
    a memory coupled to the at least one processor;
    a database residing in the memory having data in at least one partitioned database table divided into a plurality of data allocation containers (DACs);
    a database manager with a DAC manager residing in the memory and executed by the at least one processor that determines which of the plurality of DACs to place rows of data into based on data usage information stored in each row of data of the DACs, wherein the data usage information stored in each row includes a counter for a number of times each row was selected in past queries;
    wherein the DAC manager increments the counter for a number of times selected for each selected row by the query, and computes a DAC selection ratio (DSR) for each selected row by the query from a quotient of a number of queries made to the partitioned table and the number of times selected;
    wherein the DAC manager increments a counter for a number of times inspected that indicates how many times the row of data was inspected but not selected; and
    wherein the DAC manager determines if the DSR is within a predetermined range for a current DAC, and moves the row of data to a different DAC when the data selection ratio is not within the predetermined range for the current DAC.

12. The apparatus of claim 11 wherein the plurality of DACs include a high priority DAC placed in a memory device with a faster access time and a low priority DAC placed in a memory device with a slower access time.

13. The apparatus of claim 11 wherein the data usage information comprises a last accessed time stamp and the DAC manager updates the last accessed time stamp for each selected row by the query; and moves the selected row of data to an different DAC based on the last accessed time stamp.

14. The apparatus of claim 11 a wherein the data usage information comprises a time based bit map and the DAC manager updates the time based bit map for each selected row by the query, and moves the selected row of data to a different DAC based on the time based bit map.

15. The apparatus of claim 14 wherein the time based bit map is divided into a time base chosen from the following: years, months, weeks, days, hours, minutes, or seconds.

* * * * *